United States Patent
Blevins et al.

(10) Patent No.: US 6,456,567 B1
(45) Date of Patent: Sep. 24, 2002

(54) REMOTE ATTITUDE AND POSITION INDICATING SYSTEM

(75) Inventors: William Mark Blevins, Albuquerque; Lonny Rakes, Rio Rancho; Eric Judkins, Albuquerque, all of NM (US); Jeffrey Norman Schoess, Buffalo, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/829,319

(22) Filed: Apr. 9, 2001

Related U.S. Application Data

(60) Provisional application No. 60/195,925, filed on Apr. 10, 2000.

(51) Int. Cl.$^7$ .............................. G01S 3/80; G06K 11/14
(52) U.S. Cl. ........................... 367/127; 367/907; 367/96
(58) Field of Search ................... 367/907, 96, 127; 342/67; 89/41.17; 235/404; 345/679; 356/147

(56) References Cited

U.S. PATENT DOCUMENTS

| | | | |
|---|---|---|---|
| 4,247,922 A | 1/1981 | Jackson et al. ............... | 367/6 |
| 4,365,149 A | * 12/1982 | Falbel ....................... | 235/404 |
| 4,578,674 A | 3/1986 | Baker et al. ................ | 340/710 |
| 4,654,648 A | 3/1987 | Herrington et al. ......... | 340/710 |
| 4,758,691 A | 7/1988 | DeBruyne ................... | 178/19 |
| 4,777,329 A | 10/1988 | Mallicoat .................... | 178/18 |
| 4,807,202 A | 2/1989 | Cherri et al. ............... | 367/129 |
| 4,814,552 A | 3/1989 | Stefik et al. ................ | 178/18 |
| 4,853,863 A | 8/1989 | Cohen et al. | |
| 4,862,152 A | 8/1989 | Milner ....................... | 340/712 |
| 4,924,450 A | 5/1990 | Brashear et al. ............ | 367/118 |
| 4,956,824 A | 9/1990 | Sindeband et al. .......... | 367/129 |
| 5,046,053 A | 9/1991 | Gilchrist ..................... | 367/98 |
| 5,084,709 A | 1/1992 | Baghdady ................... | 342/442 |
| 5,214,615 A | 5/1993 | Bauer ........................ | 367/128 |
| 5,280,457 A | 1/1994 | Figueroa et al. ............ | 367/127 |

OTHER PUBLICATIONS

G–Mor GPS Mobile Mortar Aiming System, www.instro.com, 2002.*

Foxlin, Eric; Harrington, Michael and Pfeifer, George; *Constellation™: A Wide–Range Wireless Motion–Tracking System for Augmented Reality and Virtual Set Applications*; Jul. 19–24, 1998, Computer Graphics Proceedings, Annual Conference Series, ACM SIGGRAPH, Orlando, Florida.

Foxlin, Eric; Harrington, Michael; and Alshuler, Yury; *Miniature 6–DOF Inertial System For Tracking HMDs*; Apr. 12–14, 1998; SPIE vol. 3362; Helmet and Head–Mounted Displays III, AeroSense 98, Orlando, Florida.

(List continued on next page.)

*Primary Examiner*—Daniel T. Pihulic
(74) *Attorney, Agent, or Firm*—Loria B. Yeadon; Michele M. Burris

(57) ABSTRACT

A method and apparatus using ultrasonic sensors for determination of the pointing vector described by two points separated in space in the coordinate frame of the measuring system. For measurement, acoustic signals are transmitted from two emitters whose spatially separated coordinates form the desired pointing vector. Three detectors, associated receiver electronics and software are required to compute six distinct spheres from the time of flight measurements. The intersection of the three spheres, associated with each emitter, describe the desired location in the detector coordinate system of that emitter. With the coordinates of each emitter, the pointing vector is computed using standard geometry. A reference is required to determine the time of flight of the signals to each detector. Another embodiment uses an active reflective technique, where the timing is obtained through round trip transmission and reception of the signal with a known fixed delay at the vector points.

20 Claims, 5 Drawing Sheets

OTHER PUBLICATIONS

Barratoff, Gregory and Blanksteen, Scott; *Tracking Devices*; http://www.hitl.washington.edu/scivw/EVE/I.D.b.TrackingDevices.html Apr. 28, 2000.

Logitech 3D Mouse, Logitech Head Track by Fakespace, Inc.; http://www.qualixdirect.com/html/3d_mouse_and_head_tracker.html, Apr. 28, 2000.

Logitech Tracers *Image Dimensions*; http://www.vrdepot.com/vrteclg.htm, Apr. 28, 2000.

InterTrax/L–glasses Tracked PC–VR Displays (product description), Jul. 12, 2001.

InterSense IS–900 Precision Motion Tracker (product description), Jul. 12, 2001.

IS–600 Mark 2 Precision Motion Trackers (product description), Jul. 12, 2001.

Ultrasonic, Inertia and Hybrid Tracking Technologies, http://www.cs.nps.navy.mil/people/faculty/capps/4473/projects/chang2/full.htm, Jul. 12, 2001.

Simply . . .Ultrasonic, Inertia and Hybrid Tracking Technologies; http://www.cs.nps.navy.mil/people/faculty/capps/4473/projects/chang2/simple.htm, Jul. 12, 2001.

Perry, Lynellen D.S.; Smith, Christopher M. and Yang, Steven; An Investigation of Current Virtual Reality Interfaces; http://www.acm.org/crossroads/xrds3–3/vrhci.html, Jul. 12, 2001.

Isdale, Jerry; *What is Virtual Reality? A Homebrew Introduction and Information Resource List;* http://www.c-se.dmu, Jul. 12, 2001.

* cited by examiner

REMOTE ATTITUDE AND POSITION INDICATING SYSTEM

CROSS-REFERENCE TO RELATED APPLICATIONS

This application is based on U.S. provisional application Serial No. 60/195,925 entitled "Ultrasonic Remote Position and Orientation Sensing System", filed on Apr. 10, 2000, the teachings of which are incorporated herein by reference.

BACKGROUND OF THE INVENTION

1. Field of the Invention (Technical Field)

The invention relates to a system for determining the position and orientation of an object and more particularly a method and apparatus for an acoustic based determination of an arbitrary position and orientation of an object in space without any physical tether or connection to the object and with no alignments or predetermined spatial relationships between the system and the target object.

2. Background Art

The problem that this invention solves is efficient and accurate initial laying of an indirect fire weapon system for location and direction and subsequent attitude measurements necessary to firing the weapon system accurately at a target. Additionally, minimizing weight and power requirements as well as minimizing hardware physically attached to the weapon is crucial to the solution.

There are two methods that try to solve the problem. The first is the method employed by self-propelled weapon systems. Self propelled weapon systems use a three-axis attitude sensor and global positioning system (GPS) to determine pointing data. The second is a theoretical optical method. In this system, a barcode is attached to the end of the tube, and a barcode reader is used to measure the tube displacement and calculate azimuth.

Towed or man portable, indirect fire weapon systems are laid using a surveyed aiming circle. Once they are laid on an azimuth of fire, and have accurate position, all further aiming is done using optical sights and aiming references (aiming poles, collimators, or distant aiming points). There are several problems with this system/method of laying and subsequent pointing of indirect fire weapons; currently, survey is required to accurately emplace a mortar. An accurate survey is difficult to transfer to places where indirect fire weapon systems are set up. Additionally, the time it takes to emplace using an aiming circle is considered too long. With an aiming circle the location where the weapon is place is limited to a direct line of sight to the aiming circle. As a result, the weapon is not placed optimally for tactical considerations. While the use of an attitude sensor and GPS eliminates the need for a survey, this method also has shortcomings. The primary shortcomings of the self-propelled pointing system are excess weight, and power requirements. A towed or man portable solution cannot accommodate the equipment used on the self-propelled system. Additionally, the self propelled system is exposed to severe shock, vibration, and temperature, since it is mounted on the tube. This results in unacceptable failure rates of electronic components.

The second method is a system using optics to perform weapon pointing. A barcode is attached to the end of the weapon's tube with a barcode reader placed a few meters away. As the tube is moved, the barcode reader picks up the displacement and performs the calculations to determine azimuth and elevation. Because this optical solution is theoretical, the accuracy requirements have not been proven. The current methods fail to address weight, power, accuracy, and off tube mounting requirements.

All state of the art pointing systems require some type of position and attitude measurement device, such as a global positioning system (GPS) receiver and inertial navigation system (INS). The current method for solving this problem most often relies on installation of an Inertial Navigation System (gyroscopes and accelerometers) on the object of interest. For many applications this solution is prohibitively expensive. An optical approach requires exact positioning and re-alignments should the object's position change. Standard ultrasonic techniques demand separate sensing modules for full three-dimensional determination of orientation. A radio frequency solution requires extremely fast detection electronics (rough calculations indicate such a system would need to resolve 4.6 picoseconds to sense the minimum incremental motion of a mortar tube).

There are several other prior art systems that attempt to solve the orientation and position determination problem as discussed above.

U.S. Pat. No. 4,853,863 to Cohen, et al., discloses a system that uses light, ultrasound and string wound on encoded, spring-loaded reels as mechanisms for calculations based on distances, angle measurements and doppler shift measurements (derivatives) which are then integrated to yield distance measurements. The Cohen, et al., system calls for 3 emitters and 3 detectors, all non-collinear for obtaining the measurements. The present invention utilizes 2 emitters (collinear) and 3 detectors (non-collinear). Another distinction from Cohen, et al., is that the present invention utilizes 6 distances coupled with a means of locating the system reference frame on the geodetic grid and a means of determining reference frame orientation to calculate absolute attitude and position. No such enhancement is to be found in Cohen, et al. In addition, Cohen, et al., does not reference fire control applications as disclosed herein.

U.S. Pat. No. 5,280,457 to Figueroa, et al., discloses a means for making absolute distance measurements using ultrasound and a "strobe" signal. The device is designed to eliminate the speed of sound as a system variable. Figueroa, et al., describes a means to locate a single point in 3-space, unlike the present invention which determines object position and orientation (6 degrees of freedom) in 3-space. Figueroa, et al., also describes, as a means to accomplish this, the use of one emitter and m+2 detectors to operate in m dimensions, i.e. one emitter and 5 detectors for a 3D system. Again, this is in contrast to the present invention, which uses 2 and 3 respectively. And finally, no application other than a self-calibrating means of locating a point is given Figueroa et al.

The present system provides an easy to use means of making accurate determinations of an object's position and orientation. The object of interest can have an arbitrary orientation with respect to the sensing device. The user does not need to establish precise references or datum points when using the system.

SUMMARY OF THE INVENTION (DISCLOSURE OF THE INVENTION)

The Remote Attitude and Position Indicating Device (RAPID) is a system for determining the location and pointing attitude of an object relative to a known coordinate system. The RAPID system uses an ultrasonic based measurement technique to determine the distances from two points on the object of interest to at least three points forming a plane in the known coordinate system. The derivation of the minimum six distances is accomplished by transmitting a distinct acoustic signal from each of two emitters and deriving the time of flight of each distinct signal from the two detectors to at least three detectors. Measurement of time of flight (TOF) relies on the fact that the acoustic signals travel at the speed of sound. Derivation of the minimum, six TOF measurements requires that the detection algorithm (hardware and/or software) ascertain the instant when the acoustic signals were sent. This can be accomplished using an RF pulse transmission, which occurs at the same time as the acoustic pulse but is received instantaneously at the detector and its associated receiver electronics. Similar results can be obtained without a reference pulse by measuring the round trip time of flight, where three acoustic signals are transmitted to the two object transducers, conditioned and returned to the transmitting transducer after a fixed delay. Upon derivation of the minimum, six TOF values, six emitter/pair distances are computed, for use in final computation of object orientation using standard geometric equations.

The method described above is implemented via two primary electronic assemblies. These consist of an emitter assembly and detector assembly. Note that there are two emitter assemblies on the object of interest. The emitter assembly contains the electronic circuitry necessary to generate the required drive signals for an acoustic emitter and the RF transceiver (in the case of the RF reference system). The detector assembly contains the electronic circuitry necessary to receive, amplify and process the signals detected by a minimum of three transducers. This circuitry may also include a RF transceiver for receipt of the "time sent" reference signal. In the round trip measurement implementation, the detector assembly would contain the electronics necessary to drive the dual purpose transducers, and then receive, amplify and process the returned signals. The detector assembly will accommodate an interface to a attitude and heading reference device to enable calculation of object orientation in a know coordinate system (earth frame).

A primary object of the present invention is to enable automation of mortar laying, targeting and displacement.

Another object of the present invention is to enhance the lethality of the mortar platform.

Another object of the present invention is to connect the mortar to the digital battlefield.

A primary advantage of the present invention is that the system is minimally obtrusive to the weapons platform.

Another advantage of the present invention is since the primary electronics are not on the weapon, the environment is much more friendly, thereby reducing cost impacts of the environmental design requirements on the system Yet another advantage of the present invention is that the system is extremely light, further supporting its inclusion as part of the manpack and towed mortar systems Another advantage of the present invention is that the system does not require special setup or calibration, thereby improving operations and survivability Another advantage of the present invention is that the system accuracy is dependent on the accuracy of the pitch/roll/heading system, thereby offering tailorable performance and cost.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1:
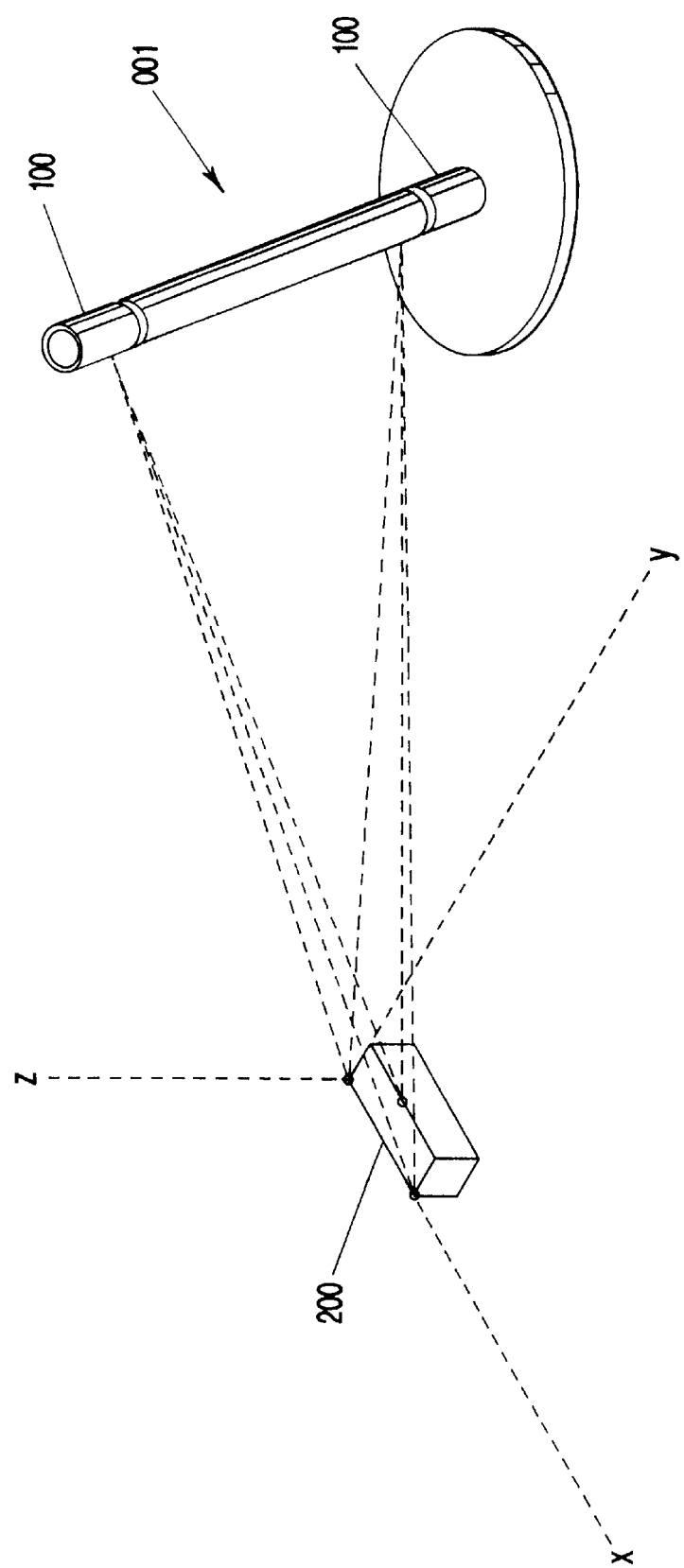
FIG. 1 shows the preferred position and orientation sensing system.

The present invention comprises a system for determining an arbitrary position and orientation of an object in space without any physical tether or connection to the object and with no alignments or predetermined spatial relationships between the system and the target object. The preferred system is shown in FIG. 1. As shown in FIG. 1, the object of interest 001 represents a mortar tube. This object 001 includes two acoustic emitter assemblies 100 mounted on the axis of the tube and separated by some know distance. The detector box and three associated transducers 200 are located at and establish the reference coordinate system for measurement of the tube attitude. As will be discussed in more detail, the six measured distances between emitter/detector pairs are used to geometrically compute the pointing vector formed by the two emitters on the tube.

Figure 2:
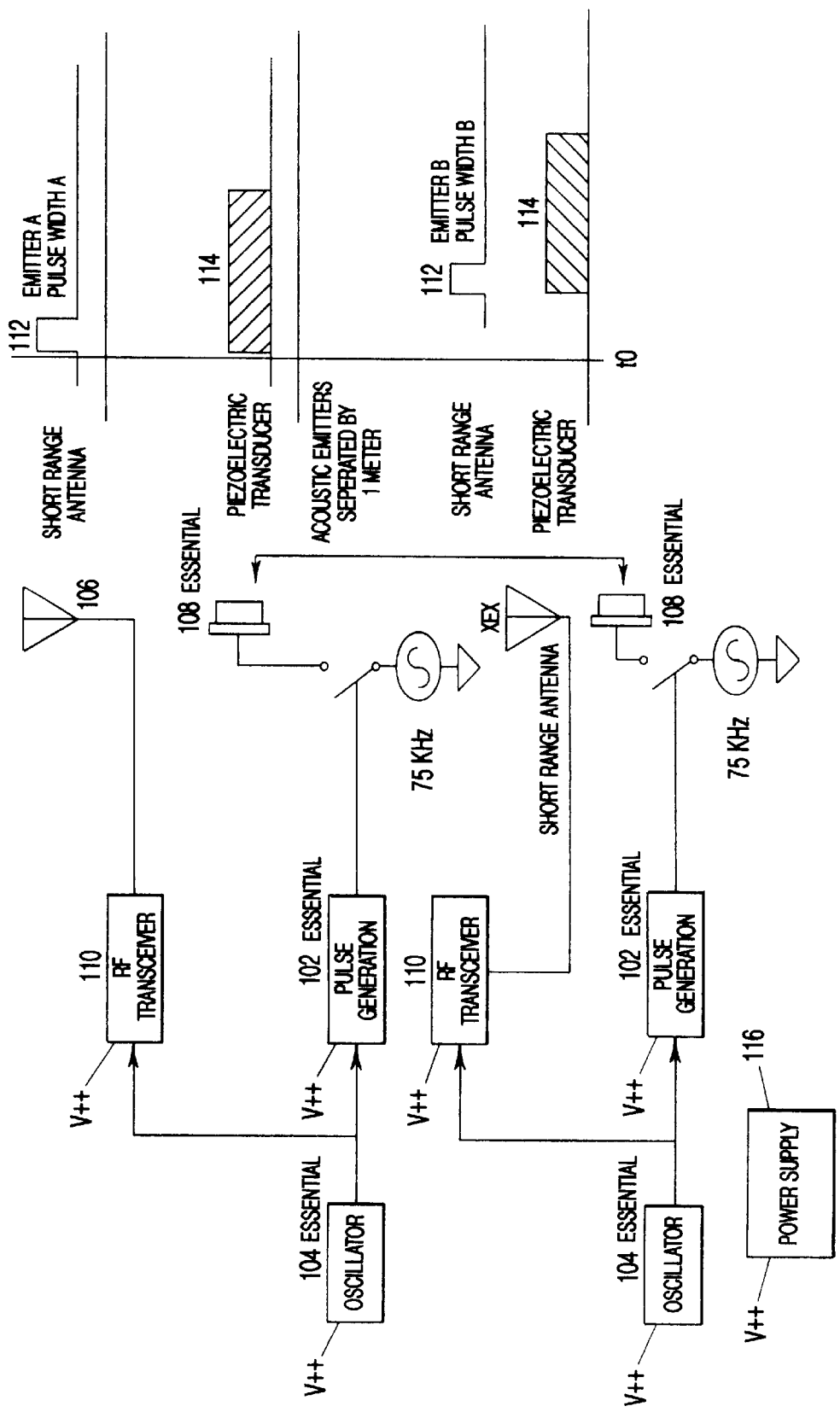
FIG. 2 schematically shows the preferred emitter assembly.
Figure 3:
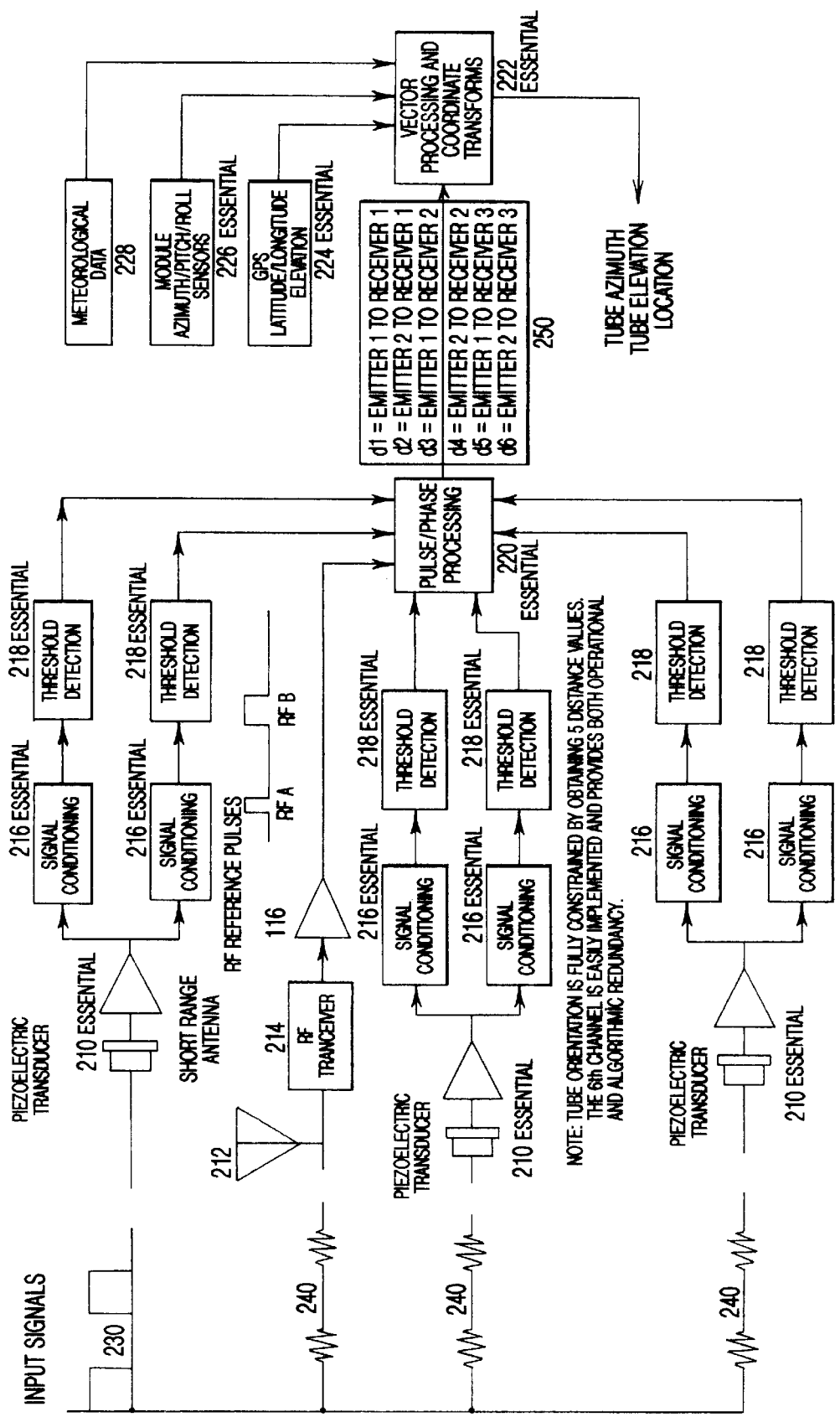
FIG. 3 shows the preferred detector module.

The system comprises an emitter assembly 100 of FIG. 2 and a detection/processing module 200 of FIG. 3 and associated software.

The emitter assembly 100, as shown in FIG. 2, is comprised of two ultrasonic transducers 108, a short-range radio frequency transceiver 110, associated drive electronics 102, power supply 116 and RF antenna 106. The electronics 102 excite the ultrasonic transducers 108 at the required resonant frequency. The transmission of the two transducers 108 may be separated in phase or in frequency in order to distinguish the signals at the detectors. The circuitry also drives the RF transceiver 110 so that it emits a suitable radio frequency pulse 112. The electronics for the acoustic and radio frequency sub-circuits derive their timing from an oscillator 104 and the phase relationship between the RF 112 and the acoustic pulses 114 is known. The RF pulse 112 serves as a timing reference at the detector module 200 and allows emitter-to-detector distances to be calculated directly from the phase relationship of the detected RF and acoustic signals and known parameters such as the speed of sound in air.

As shown in FIG. 3, the detector/processing module 200 is comprised of three ultrasonic detectors 210, signal conditioning electronics 216, threshold detection circuitry 218, a short range RF transceiver 214, a processor sub-system 220 and 222 and antenna 212. A pitch/roll/heading sense sub-system 224 and 226 is required to enable absolute position and attitude information to be obtained at the detector/processing module 200. For certain applications, like military applications, a GPS system and 'battlefield internet' capability would also be included. The meteorological data 228 is received via the 'battlefield internet'. The three ultrasonic detectors 210 are mounted on the module 200 such that they are not co-linear and thus they define a plane. The pitch/roll/heading sensors 224 and 226 are precision mounted in the module 200 with respect to this plane. Object position and orientation are referenced to the synthetic coordinate system established by the pitch/roll/heading sensors 224 and 226. The radio frequency pulse 230 is received at the detector module 200 and initializes the threshold detection and comparison process 220. Acoustic signals 240 are received and processed such that originating acoustic emitter is known. One possible embodiment of the detector design includes a timing circuit, (embodied within 220) where the high precision timer is triggered upon receipt of the RF reference pulse 230 and the time of flight measurement is obtained upon receipt of the acoustic pulses 240. A threshold detection technique 218 may be employed to determine the receipt of the acoustic pulse 240. The time interval relative to the RF pulse for time-of-flight from each of two emitters to each of three detectors results in a set of six distinct time intervals 250 for each measurement cycle. These intervals 250 are processed to determine six independent emitter-to-detector distances 250. In certain applications such as military applications, meteorological data 228 such as temperature, pressure and humidity can be factored into the distance determination to enhance accuracy. The set of all possible emitter locations that could generate a given distance result, describe a sphere in the system reference frame. The intersection of three such spheres (one for each detector) is two points, only one of which is a logical solution. This solution is the location of the emitter that originated the acoustic pulses. When the analogous computation has been performed on signals from the second emitter, the object's (e.g. mortar tube) position and orientation are completely determined. For military applications, one additional transform computation (not shown) can be performed to map the system reference frame to the geodetic coordinate system employed in fire missions. The equations for computation of the vector pointing angles, azimuth, and elevation are:

$$d1a=(A0^2+A1^{2+}A2^2)^{1/2}$$
$$d2a=((A0-R_{20})^2+A1^{2+}A2^2)^{1/2}$$
$$d3a=(A0^2+(A0-R_{30})^2+A2^2)^{1/2} \quad (1)$$
$$d1b=(B0^2+B1^{2+}B2^2)^{1/2}$$
$$d2b=((B0-R_{20})^2+B1^{2+}B2^2)^{1/2}$$
$$d3b=(B0^2+(B0-R_{30})^2+B2^2)^{1/2}$$

where $R_{20}$ is distance between origin detector and detector on x axis and $R_{30}$ is distance between origin detector and detector on y axis.

The resulting distances (d1a, d2a, d3a, d1b, d2b, d3b) are the coordinates for the emitters and azimuth and elevation is computed as follows:

$$Q=[d1a, d2a, d3a]$$
$$P=[d1b, d2b, d3b] \quad (2)$$
$$Mtube=P-Q$$
$$\phi_{xy}=\arctan(Mtube1/Mtube0)-\text{Azimuth} \quad (3)$$
$$\phi_{xz}=\arctan(Mtube2/Mtube0)-\text{Elevation} \quad (4)$$

This system could be implemented as a low cost solution with an existing off-the-self pitch/roll/heading module 224 and 226. A detector module 200 with an embedded Inertial Navigation System would provide enhanced precision, and could allow one INS to serve multiple weapons.

The preliminary design of the system relied on the use of a phase locked loop (PLL) for acoustic pulse edge detection. A 75 kHz sinusoidal acoustic pulse, of 1.6 millisecond duration, was input to the PLL. This implementation was intended to result in a very simplistic way of detecting the beginning and end of the acoustic pulse. However, the PLL was not stable enough to perform edge detection to the resolution required to obtain the distance measurement accuracy specified for the system. The design was changed to eliminate the PLL and the acoustic pulse was input to a fast A/D and processed via a digital signal processor. While other similar known techniques can be utilized, this technique allowed measurement of the pulse edge for TOF measurements to within 50 microseconds. This implementation yielded final azimuth and elevation computations to within 10 mils (0.56 degree) accuracy with averaging.

The present invention will interface to GPS and pitch/roll/heading sensors 224 and 226 to provide the reference coordinate system and position information to the detector/processing module 200. The detector/processing module 200 will also be capable of interfacing to other systems, such as communication radios, which, in the case of the fire control system application, will provide meteorological data (not shown).

Figure 4:
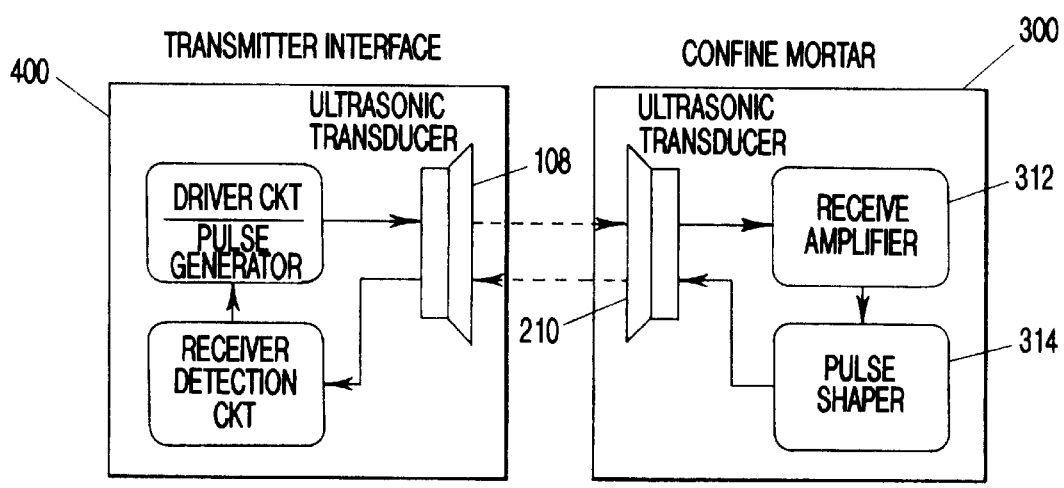
FIG. 4 shows the typical components in either of the embodiments of the invention.

The preferred embodiment of the system does not require a RF reference pulse. In this embodiment, the desired distance measurements are derived through round trip measurement of the time of flight of a transmitted acoustic pulse. The typical components for the system are shown in FIG. 4. The transmitted pulses are received at the weapon system transducer 108, amplified 312, reshaped 314 and retransmitted back to the detector/processing module 400. The delay in the active electronics at the weapon system is fixed. Therefore, the distance is equal to half of the total time of flight, less the fixed delay in the electronics.

In either embodiment, the principal detector assembly drive electronics are the same. Transducers 108 when excited by an input signal produced by the drive electronics at the proper frequency produce an acoustic pulse at the resonant frequency of the transducers 108/1210. The signal is received at the detecting transducer 210. The acoustic pulse excites the transducer 210 resulting in a voltage signal with characteristics corresponding to the frequency and amplitude of the signal received. This signal is conditioned and retransmitted (in the case of the preferred embodiment) or triggers the measurement of time of flight (in the case of RF reference pulse embodiment). The processing electronics/software captures the TOF measurement for each emitter-detector pair (or round trip TOF) and then computes the desired azimuth and elevation via a mathematical implementation of equations (1), (2), (3), and (4).

The present invention is unique in its implementation for derivation of azimuth and elevation for a weapons system. The active reflector embodiment is also unique as it eliminates the need for a reference pulse from which to base time of flight. The time of flight is obtained purely from the acoustic signal.

The transducers 210 may be driven in numerous ways to produce different characteristic signals. In particular, the pulse duration and shape may be altered to accommodate desired performance in range and signal decoding/integrity. This allows flexibility in both the drive and receive circuitry.

The processing element may take several forms, including programmable logic devices, microprocessors and digital signal processors. The power supply could be batteries or other type of portable supply such as solar cells.

The sensors and electronics may be combined to form an integrated package whose input is an unconditioned drive signal and whose output is a TOF measurement or a trigger indicating receipt of a valid acoustic pulse edge.

Additional acoustic sensors may be added for use in calibration of speed of sound variations due to temperature and other air column effects. Additional sensors will also improve accuracy of measurement and eliminate ambiguities in coordinate position measurements.

As discussed, the RF transceivers may be eliminated in the active reflector embodiment. It is also possible to eliminate the need for a processor if the algorithms are implemented in hardware and/or firmware.

It is also possible to implement the present invention using passive reflection. That is, the acoustic pulses would be transmitted and reflected off of the surface of the weapon system.

The software and/or firmware in the system will support two functions in the system. The first function will be control of the hardware. This will include initialization and reset functions for such devices as analog to digital converters and time of flight measurement timer (if implemented in hardware). The software will then read the time of flight (TOF) measurements and compute the desired azimuth and elevation outputs per the equations (1), (2), (3), and (4). These equations form the algorithms for computation of the desired weapon pointing angles. The angles will be converted to the coordinate system of the pitch/roll/heading sensors 224 and 226 by the software. The software will also include a user interface function, which provides pointing cues to the weapons system operator. These cues will provide information for positioning the weapon at the correct attitude necessary to hit its target.

Figure 5:
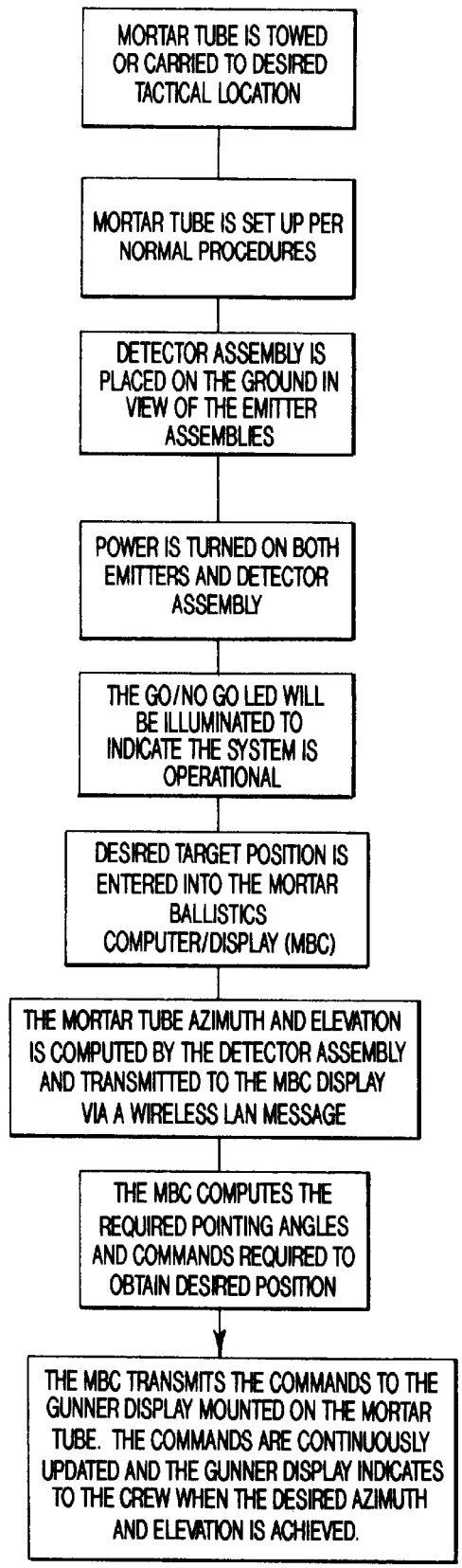
FIG. 5 is a flow chart showing a typical method of using the invention.

No user alignments are required. For the proposed military application as shown in FIG. 1, the field soldier would set up his mortar 001, set the detector module 200 on the ground one to three meters away and turn both the emitter assembly 100 and detector module 200 on. Five seconds later, his gun 'knows' where it is and where it's aimed. Ease of use is a prime benefit of this system. FIG. 5 is a flow chart showing a typical method for using the preferred embodiment in a mortar tube application.

While originally conceived as a user-friendly fire control system for mortar applications, the method described herein can be used in any situation where non-contact sensing of position and orientation would be needed. There are a number of possible applications, including:

Sensing the position/orientation of more than one mortar with a single detector module. In principle, unique emitter carrier frequencies (or pulse trains) and complementary receiving electronics would allow more than one weapon to be served by a single detection module.

The invention can be used on larger weapon systems, such as tank tubes. In addition to providing targeting information, the system could replace the tube-droop sensing system (currently a laser/reflector/detector implementation) as well.

Recreational target shooters or the operators of shooting ranges might employ such a system to provide a 'no hassle' bore sighting service.

Owners of high-end telescopes for amateur astronomy could find this system very attractive, especially when interfaced with one of the precision mount drives.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for determining a position and orientation of an object, the method comprising the steps of:

providing two linearly aligned emitters on the object;

providing at least three non co-linear detectors in line of sight from the at least two linearly aligned emitters;

providing a system frame of reference;

transmitting a distinct signal from each of the at least two linearly aligned emitters;

receiving the distinct signals by each of the at least three non co-linear detectors;

deriving at least six time of flight measurements from the distinct signals to the at least three non co-linear detectors; and computing the position and orientation of the object relative to the system frame of reference from the derived at least six time of flight measurements.

2. The method of claim 1 wherein the step of deriving at least six time of flight measurements comprises deriving a round trip time interval of each of the transmitted distinct signals.

3. The method of claim 2 further comprising factoring a known delay time for active electronics for re-transmitting the distinct signals back to each of the at least two linearly aligned emitters.

4. The method of claim 1 wherein the step of deriving at least six time of flight measurements comprises triggering a precision timer upon receipt of a timing signal transmitted simultaneously with each transmitted distinct signal.

5. The method of claim 1 further comprising the step of converting the time of flight measurements to distances.

6. A system for determining position and orientation of an object, the system comprising:

at least five acoustic transducers wherein at least three of said at least five acoustic transducers comprise non co-linear detectors and at least two of said at least five acoustic transducers comprise linear emitters affixed on the object;

a means for providing said system with a frame of reference;

a means for sending a distinct signal from each of said at least two linearly aligned emitters to said at least three detectors;

a means for receiving each said distinct signal by said non co-linear detectors;

a means for determining at least six time of flight measurements from said received distinct signals; and a means for computing the position and orientation of the object from said at least six time of flight measurements relative to said frame of reference.

7. The invention of claim 6 wherein said frame of reference comprises a geodetic frame of reference.

8. The invention of claim 6 wherein said frame of reference comprises a known orientation of said at least three non co-linear detectors.

9. The invention of claim 6 wherein said frame of reference comprises a member from the group consisting of a global positioning system (GPS), an inertial navigation system (INS) and pitch/roll/heading sensors.

10. The invention of claim 6 wherein said at least five transducers comprise a range of frequency from 25 KHz to 200 KHz.

11. The invention of claim 6 wherein each of said at least six time of flight measurements comprise a time from transmission of said distinct signal by each of said at least two linearly aligned emitters to receipt of each of said distinct signals by each of said at least three non co-linear detectors.

12. The invention of claim 6 wherein each of said at least six time of flight measurements further comprise a timing circuit to measure a time between transmission of each of said distinct signals to receipt of said distinct signals by each of said non co-linear detectors.

13. The invention of claim 12 further comprising a timing reference on each transmitted distinct signal.

14. The invention of claim 6 wherein each of said at least six time of flight measurements comprise a round trip time interval for each distinct signal from said at least two linearly aligned emitters to each non co-linear detector minus electronic delays.

15. A system for determining a position and orientation of a mortar tube, the system comprising:

five acoustic transducers wherein two of said five acoustic transducers comprise linear emitters affixed to the mortar tube and three of said five transducers comprise non co-linear detectors positioned in a field of view of said emitters;

a means for providing said system a geodetic frame of reference;

a means for sending a distinct signal from each of said two linear emitters to said three non co-linear detectors;

a means for determining six time of flight measurements from said received distinct signals; and a means for computing the position and orientation of the mortar tube from said six time of flight measurements relative to said frame of reference.

16. The invention of claim 15 wherein said frame of reference comprises a member from the group consisting of a global positioning system (GPS), an inertial navigation system (INS) and pitch/roll/heading sensors.

17. The invention of claim 15 wherein each of said six time of flight measurement comprise a time from transmission of said distinct signal by each of said two linear emitters to receipt of each of said distinct signals by each of said three non co-linear detectors.

18. The invention of claim 15 wherein each of said six time of flight measurements further comprise a timing circuit to measure a time between transmission of each of said distinct signals to receipt of said distinct signals by each of said non co-linear detectors.

19. The invention of claim 18 further comprising a timing reference on each transmitted distinct signal.

20. The invention of claim 15 wherein each of said six time of flight measurements comprise a round trip time interval for each distinct signal from said linear emitters to each said non co-linear detector minus electronic delays.

* * * * *